May 9, 1939.  H. KIESER  2,157,542
GOVERNOR
Filed Dec. 4, 1936  3 Sheets-Sheet 1
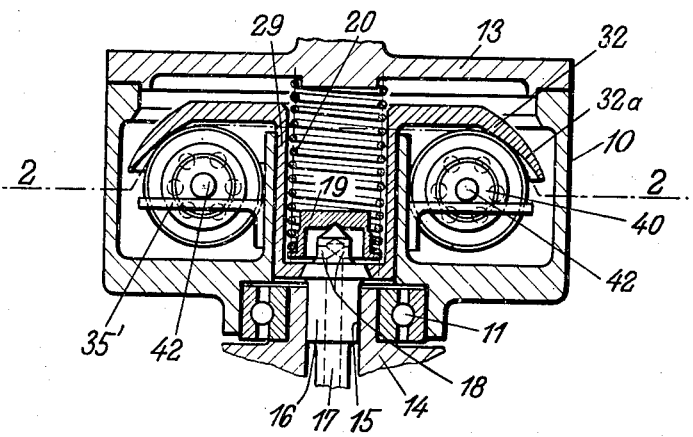
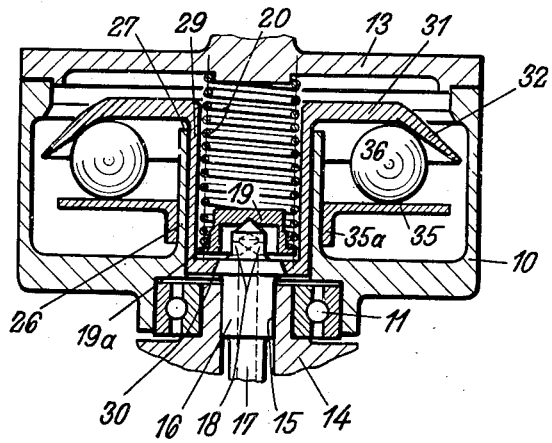
INVENTOR
HUGO KIESER
by C. P. Goepel.
ATTORNEY

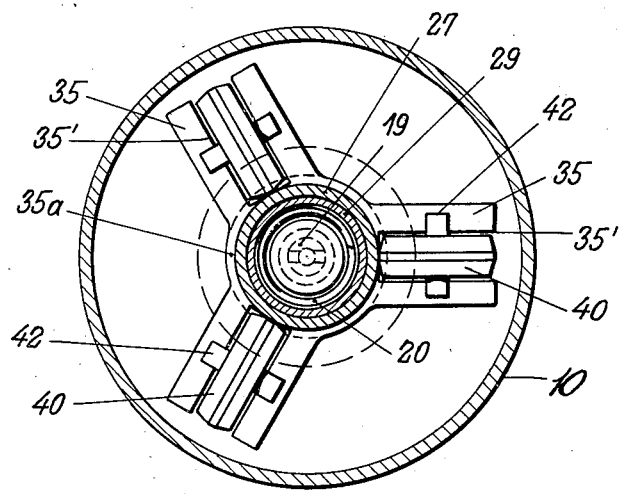
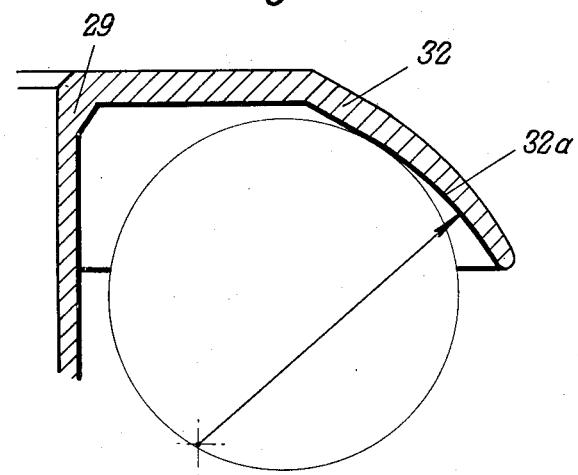

May 9, 1939.　　　　H. KIESER　　　　2,157,542
GOVERNOR
Filed Dec. 4, 1936　　　3 Sheets-Sheet 3
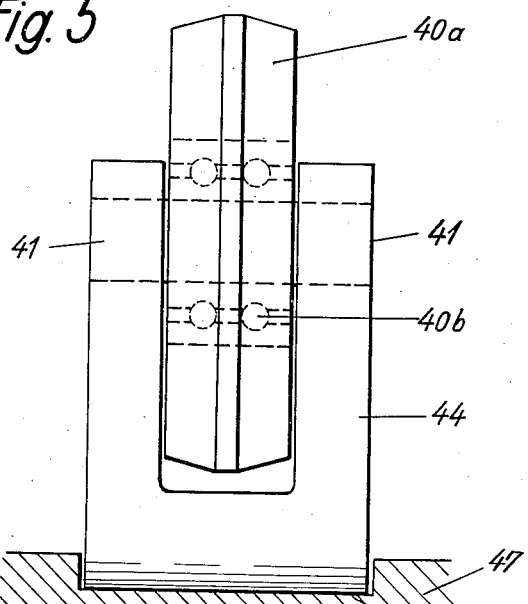
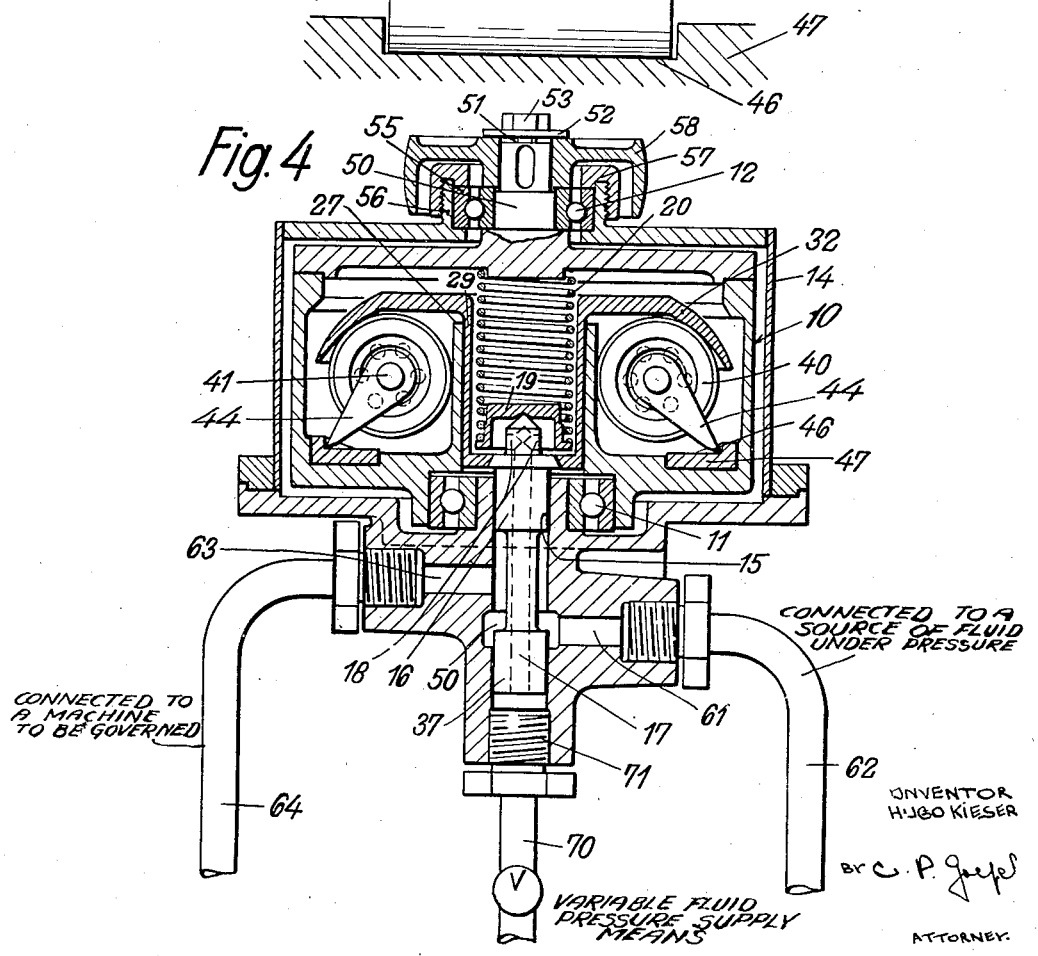

Patented May 9, 1939

2,157,542

UNITED STATES PATENT OFFICE 2,157,542

GOVERNOR

Hugo Kieser, Heidenheim-on-the-Brenz, Germany, assignor to J. M. Voith, Heidenheim-on-the-Brenz, Germany, a copartnership composed of Walther Voith, Hermann Voith, and Hans Voith Application December 4, 1936, Serial No. 114,106
In Germany December 7, 1935

18 Claims. (Cl. 264—3)

This invention relates to governors, and more particularly such as are used in regulating power and working machines.

The object of the invention is to provide a small and light speed governor having for its primary purpose to regulate the governed machine for constant speed of rotation, which allows the change of said speed of the governed machine within arbitrary and liberal limits without producing an alteration of the "degree of speed variation" inherent in the governor mechanism.

The governor structure of my invention consists of a casing, a longitudinally movable hood therein, operated upon by members circularly arranged around the longitudinal axis of the hood and subjected to centrifugal forces during the rotation of the casing so that as the members move radially outwardly such outward movement is translated to a longitudinal movement of the hood. These operative parts of the governor are under the action of pressures resulting from a pressure fluid within said casing which acts as a loading means for the longitudinally moving hood. Variations of the intensity of the pressure fluid enable the structure described to be used for governors at different speeds, whereby the "degree of speed variation" will be constant for the entire range of speeds of the machine to be governed.

The invention enables governors to be constructed which are accurate and responsive in their operation, and which may be adjusted in respect to their operation within considerable limits.

My invention overcomes the objection to governor designs having spring loaded flyballs, which require quite a number of design features in order to maintain constant the degree or "coefficient of speed" variation when the speed is changed. These requirements lead to rather clumsy governor constructions. Furthermore, the available speed range is comparatively small on account of the inherent limitations of the springs. The coefficient of speed variation in the meaning of this invention, is the ratio between the speed corresponding to the highest position of the hood and that corresponding to the lowest position of the hood of the governor, which ratio in this case is constant for all operating speeds of the governed machine.

The design of the improved governor in accordance with my invention is simple despite the large range of speed adjustment obtained. The oil which fills the governor housing and rotates with the flyballs has, aside from its valuable purpose as a counteracting means to the flyball action, a damping effect on the governor action, allowing use of this governor particularly in such cases where heavy shocks occur.

The invention will be further described hereinafter, embodiments thereof shown in the drawings, and the invention will be finally pointed out in the claims.

In the accompanying drawings:

Figure 1 is a longitudinal central section of one embodiment of my invention,

Figure 2 is a similar section of another embodiment of my invention,

Figure 3 is a plan view taken on line 2—2 of Figure 1,

Figure 4 is a similar section of still another embodiment of my invention,

Figure 5 is a side view of certain of the parts shown in Figure 4, and Figure 6 shows a portion of the curved cam surface on which the flyballs move.

Similar characters of reference indicate corresponding parts throughout the various views.

Referring to the drawings, and more particularly to Figure 1, the closed cylindrical casing 10 is supported by ball bearings 11 and 12 mounted in a stationary housing 14 (see Figure 4). This housing has a central bore 15 in which is slidably arranged a rod 16, having a central bore 17 terminating in cross channels 18. The bore 17 and cross channels 18 serve to enable the interior of the casing 10 to be supplied with pressure fluid. A cap 19 is superposed upon the end of the rod 16, which cap has a circumferential flange 19a upon which rests one end of a spring 20, and the other end of which presses against the wall 13 of the casing 10.

The interior of the casing 10 has cylindrical sleeve member 26 which extends from the bottom towards the top of the casing but does not reach to the top, allowing a space between its upper rim 27 and the top wall of the casing. Within this sleeve is a movable cup 29, having a bottom 30 secured to the rod 16. This cup 29 has a circumferential table portion 31, substantially horizontally disposed, carrying at its periphery a downwardly extending circumferentially arranged flange 32, the interior surface of which acts as a cam surface. The portion 31 and the flange 32 of the cap 29 form an umbrella-like structure, or a hood.

Upon the exterior of the sleeve 26 there is disposed another table portion 35 which has a flange 35a extending circumferentially around the sleeve and is suitably secured thereto by a friction fit, or other suitable means. Between these two table portions 31 and 35, balls 36 are arranged which are freely movable radially inward and outward. With the exception of the housing 14, all of the foregoing parts are adapted to be rotated.

The operation of the device described is as follows:

When the casing 10 is rotated, the balls 36 under the action of centrifugal force move radially outwardly and abut against the circumferential flange 32 and thereby cause the hood to be raised until a state of equilibrium is reached between the axial force produced by the centrifugal action of the balls 36 in upward direction and the downward force produced by oil pressure inside the casing 10. It will be seen that in each embodiment shown in the drawings, the base or bottom 30 of the cup 29 is larger in cross-sectional area than that of the plunger rod 16, and that the cross-sectional area of rod 16 is the same as that of the valve member 37. The oil under pressure acts upon the cross-sectional area of the valve member 37, and the oil under pressure within cup 29 acts upon its cross-sectional area, which is substantially that of the base 30. Assuming now that for all practical purposes, the oil pressure be the same in the space below the valve member 37 and in the casing 10, the effective biasing force is equal to the difference of the forces produced by the oil pressure when acting upon the cross sectional area of base 30 and valve member 37, respectively, as the cross sectional area of base 30 is larger than the cross sectional area of valve member 37, this biasing force, as will be readily seen, acts always downwardly, when the governor is in a position such as shown in Fig. 4. It will further be noted that this biasing force through the action of hood 32 and flange thereon counteracts the centrifugal force produced by the fly balls. Thus in order to obtain a constant speed the oil pressure within the casing has to be predetermined in such a way that a state of equilibrium is obtained between the biasing pressure and the centrifugal force of the fly balls at the desired constant speed of the governed machine. It is therefore evident that governed speed may be changed arbitrarily by altering the pressure of the fluid in the casing. The raising of the hood moves the rod 16 upwardly and thereby the valve member 37 (see Figure 4) on this rod controls the amount of power fluid entering the device or machine being speed-controlled.

In the embodiment shown in Figure 1, the interior cam surface of the flange 32 is inclined in a plane, but this may be a curved surface, as shown in Figure 2.

In Figure 2, an embodiment is shown like Figure 1, save that instead of the balls or spheres 36, circular members 40 are provided. These members have secured thereto laterally extending trunnions 42, which trunnions are adapted to roll on table portions 35¹. The peripheral parts of the members 40 press against the flanges 32, under the action of centrifugal force when the structure shown in Figure 2 is rotated in respect to the housing 14. The surface 32ᵃ is shown curved as before stated. Figure 3 shows a plan view of this structure.

In Figures 4 and 5 another embodiment is shown. The trunnion 41 of the circular members has secured thereto extensions 44 which taper to a knife edge engaging the corners 46 of the seat 47, secured in the interior of the cylindrical casing 10.

In Figure 5 is shown a side view of the members 40, the trunnion 41 extending laterally thereof, and of the extensions 44, engaging the corner 46 of the seat 47.

In the embodiment shown in Fig. 4, the seat 47 is located at the bottom of the casing in its circumferential section. The members 40 act under centrifugal forces in the same manner as the members 36 in Fig. 1, and these members 40 support the members 41 by means of ball bearings, indicated by 40ᵇ, in order to reduce friction. Knife edge extensions 44 are supported on said members 41 and are engaged by corners 46 on seats 47, the main purpose of said extensions 44 being to support the members 40. The position of said members 40, within the confined limitations of their movement, enables the extensions 44 to engage the corners 46, and should the governor be in at-rest position these extensions hold the members 40 in position against flange 32 and sleeve 27, and additionally they support the members 40 so that when the casing is rotated these members 40 are in position to perform their intended function.

The members 40 of Figures 3, 4 and 5, consist of an outer ring 40ᵃ movable around a ball bearing 40ᵇ upon the trunnion or axle 41. The knife edge members 44 support the axle 41.

The application of my invention to a practical installation is shown in Figure 4 in which the casing 10 has a central shaft 50 extending upwardly, where it is provided with screw threads 51 and washer 52 and nut 53. Upon the shouldered sub-calibered shaft 50, ball bearing 12 is seated in a flange 56 of a stationary housing 14. A cap nut 57 engages the exterior of this flange to hold the ball bearing in position. Also upon the sub-calibered shaft 50 is secured a pulley 58.

In the lower part of the housing 14, the central bore thereof through which the rod 16 passes is an enlarged chamber 60 which surrounds the rod 16. This chamber 60 is connected with a conduit 61, in turn connected with a pipe 62. Communicating with the central bore is another conduit 63, in turn connected with a pipe 64. A valve member 37 on the rod 16, when in its lowermost position, permits fluid to pass from conduit 61 to conduit 63. When in its raised position it closes communication between conduits 61 and 63. The pipe 62 receives fluid from a pump. The pipe 64 supplies the fluid under pressure to the device or machine to be governed.

A pipe 70 supplies pressure fluid to the conduit 71, which communicates with the bore 17 of the rod 16, and thereby the interior of the casing is supplied by this pressure fluid, the intensity of the pressure of which may be regulated.

A soft spring 20 keeps the hood pressed against the balls if the oil pressure fails. This spring takes so little part in the load on the hood compared with the load produced by the oil pressure that it may be neglected for all practical intents. The influence of the static effect produced by the weight of the balls and ball supports on the centrifugal action is so small that the stability of the governor is not changed thereby.

For certain requirements of stability of operation, it is advantageous to use curved cam surfaces, the curvature thereof being shaped in accordance to a pre-determined law, whereby the ratio between centrifugal action and load on the hood changes in the desired manner with the stroke of the hood. This change of the transmission ratio remains the same for all intensities of oil pressure which may be utilized so that the stability of the governor remains constant over the whole range of speed adjustment (see Figure 6).

In Figure 6, the curved portion 32ª is shown on a larger scale than in Figure 2. This surface 32ª is so shaped as to comply with the aforesaid predetermined law. The outline of a ball and its relation to said curved surface is shown in Figure 6. The arrow shown in Figure 6 is a radius of curvature, and at right angles to the tangent of the curved portion at the point where the pointed end of the arrow contacts or intersects with said surface. The ball longitudinally contacts with another part of the curved surface. The curvature of said curved surface is so shaped that for the end position of the hub, the force exerted by the flyballs normally to said curved surface, forms with the respective supporting force and the centrifugal force a polygon of forces, the altitude of which is always equal to the load on the hub. From Figure 6 and the foregoing, it will be seen that the improved flyball type speed governor for power and working machines has a hub loaded by arbitrarily variable oil pressure, and operates with constant coefficient of speed variation, and that the stroke traveled by the flyballs is transmitted to the hub, loaded by constant fluid pressure, through the medium of a curved surface, whereby the curvature of the curved surface is shaped so that, for each position of the hub, the force exerted by the flyballs normally to said curved surface forms with the respective supporting force and with the centrifugal force, a polygon of forces, the altitude of which is always equal to the load on the hub.

The relationship between the forces is arrived at as follows:

To each position of the flyballs belongs a definite magnitude of the centrifugal force. Further, in each position of the flyballs, a supporting force acts in a definite direction. This supporting force in Figures 1 and 2 is perpendicular because the ball member rests on the horizontal support. In Figure 4 it is inclined, as the ball member is supported by the inclined member 44. Of the polygon of forces, we know, first, the magnitude and direction of one force, namely, the centrifugal force; and second, the direction of the supporting force. With these two sides of the polygon, we also know the vertical component of the third side of the polygon, namely, the load on the hub, which, as stated, remains constant for all positions the hub may assume at a given speed. This vertical component of the third side of the triangle is the altitude of the polygon of forces.

Hence, the entire polygon may be constructed. Thereby, it is possible to determine the direction of the force, the perpendicular of which is tangent to the curvature for each position of the hub.

The embodiment shown in Figure 4 has the advantage that the circular members will not be thrown off their seats, even if the governor itself is subject to movements involving angular motion creating centrifugal forces, other than those acting on the circular members. This embodiment of governor shown in Figure 4 may be operated in any position of the governor in space.

It will have been noted that the improved speed governor, with flyball members for power and working machines allowing arbitrary speed adjustment at constant "coefficient of speed variation", functions by having such a flyball member act upon a cam surface, to move such cam surface away from the flyball member against a liquid pressure controlled yielding resistance, the movement of the flyball member taking place when centrifugal forces created by the rotation of the flyball member around an axis of rotation, act upon the flyball member. The movement of the cam surface sets in operation speed controlling devices before described.

Having thus described my invention and the embodiments thereof, I do not wish to be limited to the particularities thereof, and desire to include such changes as may be made without departing from the spirit of my invention, as defined in the appended claims.

I claim as my invention:

1. A speed governor for power and working machines allowing arbitrary speed adjustment at constant coefficient of speed variation, a rotatable casing, a rotatable support therein, a rotatable flyball member on said support, a rotatable longitudinally moving member having a cam surface directly acted upon by said flyball member, fluid means resisting the movement of said moving cam surface member, means supplying said fluid under pressure to said casing, and means having differential areas acted upon by the pressure of said fluid in said casing for producing a biasing action, whereby when said parts are rotated, the flyball member acted upon by centrifugal forces moves the said moving cam surface member longitudinally until equilibrium between the action of the centrifugal forces and the resisting fluid takes place.

2. A speed governor for power and working machines allowing arbitrary speed adjustment at constant coefficient of speed variation, a rotatable casing, a rotatable support therein, flyball members on said support in said casing, a longitudinally moving member in said casing having a cam surface directly acted upon by said flyball members, fluid pressure means in said casing resisting the movement of said moving cam surface member, means supplying fluid under pressure to said fluid pressure means in said casing, and means having differential areas acted upon by the pressure of said fluid in said casing for producing a biasing action, whereby when said casing is rotated, the flyball members acted upon by centrifugal forces, move the said cam surface member longitudinally until equilibrium between the action of the centrifugal forces and the intensity of the fluid pressure within the casing and acting on the cam surface means takes place.

3. A speed governor for power and working machines allowing arbitrary speed adjustment at constant coefficient of speed variation, a rotatable casing having fluid means under pressure therein, a rotatable support therein, rotatable flyball members on said support, a rotatable longitudinally moving member having a cam surface directly acted upon by the said flyball members, said cam surface being inclined to the axis of rotation of the rotatable members, said fluid resisting means acting upon said longitudinally moving member, means supplying fluid under pressure to said casing, and means having differential areas acted upon by the pressure of said fluid in said casing for producing a biasing action, whereby when said parts are rotated, the flyball members acted upon by centrifugal forces, move the said cam surface member longitudinally, until equilibrium between the action of the centrifugal forces and the resisting means takes place.

4. A speed governor for power and working machines allowing arbitrary speed adjustment at constant coefficient of speed variation, a rotatable casing having fluid means under pressure therein, a rotatable support therein, rotatable flyball members on said support, a rotatable longitudinally moving member having a cam surface directly acted upon by the said flyball members, said cam surface being curved in respect to the axis of rotation of the rotatable members, said fluid pressure means resisting the movement of the moving cam surface members, means supplying fluid under pressure to said casing, and means having differential areas acted upon by the pressure of said fluid in said casing for producing a biasing action, whereby when said parts are rotated, the flyball members acted upon by centrifugal forces, move the said cam surface member longitudinally, until equilibrium between the action of the centrifugal forces and the resisting means takes place.

5. A speed governor for power and working machines allowing arbitrary speed adjustment at constant coefficient of speed variation, a rotatable casing, a rotatable support therein, rotatable flyball members on said support, said support including knife edge members supporting the flyball members, a rotatable longitudinally moving member having a cam surface directly acted upon by the said flyball members, said cam surface being inclined to the axis of rotation of the rotatable members, fluid pressure means resisting the movement of the cam surface member, means supplying fluid to said fluid pressure means, and means having differential areas acted upon by the pressure of said fluid for producing a biasing action, whereby when said parts are rotated, the flyball members acted upon by centrifugal forces, move the said cam surface member longitudinally, until equilibrium between the action of the centrifugal forces and the resisting means takes place.

6. A speed governor for power and working machines allowing arbitrary speed adjustment at constant coefficient of speed variation, a rotatable casing having fluid means under pressure therein, a rotatable support therein, rotatable flyball members on said support, a rotatable longitudinally moving member including a table portion having a peripheral downwardly extending inclined flange with a cam surface, the undersurface of which is directly in contact with the flyball members, said cam surface being inclined to the axis of rotation of said rotatable members, said fluid pressure means resisting the movement of said cam surface, means supplying fluid to said fluid pressure means, and means having differential areas acted upon by the pressure of said fluid for producing a biasing action, whereby when said parts are rotated, the flyball members acted upon by centrifugal force move said cam surface member longitudinally, until equilibrium between the action of the centrifugal forces and the resisting means takes place.

7. A speed governor for power and working machines allowing arbitrary speed adjustment at constant coefficient of speed variation, a rotatable casing, a rotatable support therein, rotatable flyball members on said support, said flyball members on said support including ball bearing rollers having centrally disposed trunnions acting upon said support, a rotatable longitudinally moving member having a cam surface directly acted upon by the said cam surface member, said cam surface being inclined to the axis of rotation of the rotatable members, means supplying said casing with fluid under pressure, and means having differential areas acted upon by the pressure of the fluid for producing a biasing action, and whereby when said parts are rotated, the flyball members acted upon by centrifugal forces, move said cam surface member longitudinally until equilibrium between the action of the centrifugal forces and the pressure of the fluid takes place.

8. A speed governor for power and working machines allowing arbitrary speed adjustment at constant coefficient of speed variation, a rotatable casing, a housing for the casing, means disposed between the casing and housing to permit rotation of the casing in respect to the housing, the casing and housing being co-axial, flyball members in said casing, supporting means in said casing for said flyball members, movable means under the pressure of said fluid means opposing the radial movement of said flyball members on said support, a rod coaxial with the casing and housing and having a channel therein for supplying fluid to said movable means, means supplying said channel with pressure fluid, and means having differential areas acted upon by the pressure of said fluid for producing a biasing action.

9. A speed governor for power and working machines allowing arbitrary speed adjustment at constant coefficient of speed variation, comprising a rotatable casing, a housing for the casing, means disposed between the casing and housing, the casing and housing being co-axial, flyball members in said casing, supporting means in said casing for said flyball members, movable means opposing the radial movement of said flyball members on said support, a rod co-axial with the casing and housing and having a channel therein adapted to supply pressure fluid to the casing, means supplying said channel with pressure fluid, means having differential areas acted upon by the pressure of the fluid for producing a biasing action, a conduit in said housing, one end adapted for receiving fluid, and the other end adapted for discharging the fluid, a valve member on said rod, said valve member being disposed in said conduit, for opening or closing the same, to permit or obstruct fluid passing through the conduit from one end to the other thereof, and means connecting the movable opposing means with said rod, whereby upon the movement of said opposing means the rod is moved and the valve member operated.

10. A speed governor for power and working machines allowing arbitrary speed adjustment at constant coefficient of speed variations, comprising a rotatable casing, a housing for the casing, means disposed between the casing and housing to permit rotation of the casing in respect to the housing, the casing and housing being co-axial, a rod centrally disposed in the casing and having a channel in communication with the interior of the casing and adapted to supply pressure fluid to the interior of said casing, means supplying said channel with fluid, means regulating the intensity of said pressure fluid before it enters the channel, a symmetrical centrally disposed hood on said rod and adapted to move longitudinally of the casing, means having differential areas acted upon by the pressure of the fluid for producing a biasing action, a support for the flyball members, flyball members movable on said support and acting directly upon the hood, said hood being resisted in its movement by the pressure fluid in the casing, a fluid control means for the power or working machine, and a valve member on said rod for said fluid control means, whereby upon the radial movement of the flyball members the hood is moved, and the valve member on the rod moving with the hood operates the control means.

11. A speed governor for power and working machines allowing arbitrary speed adjustment at constant coefficient of speed variations, comprising a rotatable casing, a housing for the casing, means disposed between the casing and housing to permit rotation of the casing in respect to the housing, the casing and housing being co-axial, a rod centrally disposed to the casing and having a channel in communication with the interior of the casing and adapted to supply pressure fluid to the interior of said casing, means supplying said channel with fluid, means regulating the intensity of said pressure fluid before it enters the channel, a symmetrical centrally disposed hood on said rod and adapted to move longitudinally of the casing, means having differential areas acted upon by the pressure of the fluid for producing a biasing action, a support for the flyball members, flyball members movable on said support and acting directly upon the hood, said hood being resisted in its movement by the pressure fluid in the casing, a fluid control means for the power or working machine, a valve member on said rod for said fluid control means, whereby upon the radial movement of the flyball members the hood is moved, and the valve member on the rod moving with the hood operates the control means, and a spring disposed within the casing between the hood and one wall of the casing normally pressing the hood against the flyball members.

12. A speed governor for power and working machines allowing arbitrary speed adjustment at constant coefficient of speed variations, comprising a housing, a closed hollow casing of cylindrical shape with a vertical axis rotatable on said housing, a cylindrical rod co-axially disposed in respect to the casing and having a central channel for supplying the interior of the casing with pressure fluid, one end of said channel being within the casing, and the other end being connected with the pressure fluid supply, means supplying said channel with fluid, the pressure of said fluid acting against the end of the rod, a rotatable cylindrical cup member secured to said rod, whereby the rod rotates with the cup member, said pressure fluid acting against the base of said cup member, the area of said base being larger than the area of the end of said channel rod, a circular table portion on said cup member, a circumferential flange on the periphery of said table portion, symmetrically disposed flyball members within the casing and adapted to be rotated as a group, means for supporting the flyball members from the casing, a circular conduit in the housing surrounding the rod, a valve member on said rod and rotating therewith and acting in said circular conduit, said conduit, valve member and rod being co-axial, a pipe supplying said conduit with fluid, and a pipe discharging said conduit of fluid, whereby upon the rotation of the casing, cup member, flyball members and rod, the flyball members acted upon by centrifugal forces move the cup member longitudinally against the pressure of the pressure fluid within the casing acting upon the table portion, and other parts of the cup member, and in moving the rod actuate the valve member to regulate the passage of fluid through the housing conduit, said governor being operative in any position in respect to the vertical.

13. A speed governor for power and working machines allowing arbitrary speed adjustment at constant coefficient of speed variation, a revoluble casing adapted to contain fluid under pressure, means for supplying said casing with fluid, a support for said casing, means for rotating said casing, flyball members supported within said casing, and an embracing hood for said flyball members, said hood having a portion acting as a piston in respect to the fluid in the casing, and having a circumferential flange engaging the flyball members, said flange having a curved surface, said hood being longitudinally movable within the casing when the flyball members are moved radially outwards under the action of centrifugal forces on the rotation of the casing, a second piston for said hood, the area of the second piston being less than that of the first-named piston, pressure fluid acting upon both pistons, and means connected with the hood for regulating fluid to the machine to be governed.

14. A speed governor for power and working machines allowing arbitrary speed adjustment at constant coefficient of speed variation, a revoluble casing adapted to contain fluid under pressure, a support for said casing, means for rotating said casing, flyball members supported within said casing, an embracing hood for said flyball members, said hood having portions acting as pistons in respect to the fluid in the casing, one of said pistons having a greater area than that of the other piston, means for supplying pressure fluid to act upon said pistons, and having a circumferential flange engaging the flyball members, said flange having a curved surface, said hood being longitudinally movable within the casing when the flyball members are moved radially outwards under the action of centrifugal forces on the rotation of the casing, means connected with the hood for regulating fluid to the machine to be governed, and means for supporting the flyball members, said means being arranged at an arbitrarily selectable angle in respect to the casing.

15. A speed governor for power and working machines allowing arbitrary speed adjustment at constant coefficient of speed variation, a revoluble casing adapted to contain fluid under pressure, a support for said casing, means for rotating said casing, flyball members supported within said casing, an embracing hood for said flyball members, said hood having portions acting as pistons in respect to the fluid in the casing, said pistons having different areas, means for supplying pressure fluid to act upon said pistons, and having a circumferential flange engaging the flyball members, said flange having a curved surface, said hood being longitudinally movable within the casing when the flyball members are moved radially outwards under the action of centrifugal forces on the rotation of the casing, means connected with the hood for regulating fluid to the machine to be governed, and means for supporting the flyball members, said means being arranged at an arbitrarily selectable angle in respect to the casing, said supports having knife edges engaging the casing.

16. A speed governor for power and working machines allowing arbitrary speed adjustment at constant coefficient of speed variation, a revoluble casing adapted to contain fluid under pressure, a support for said casing, means for rotating said casing, flyball members supported within said casing, an embracing hood for said flyball members, said hood having portions to act as pistons in respect to the fluid in the casing, said pistons having different areas, means for supplying pressure fluid to act upon said pistons, and having a circumferential flange engaging the flyball members, said flange having a curved surface, said hood being longitudinally movable within the casing when the flyball members are moved radially outwards under the action of centrifugal forces on the rotation of the casing, and means connected with the hood for regulating fluid to the machine to be governed, including a rod connected with the hood, and a control piston on said rod having a channel for introducing fluid under pressure into the casing.

17. A speed governor for power and working machines allowing arbitrary speed adjustment at constant coefficient of speed variation, a rotatable casing, a support therein and rotatable therewith, fly ball members on said support, a longitudinally moving member rotatable with said fly balls, having a curved cam surface acted upon by said fly balls, said member having pistons of different cross-sectional areas adapted to be acted upon by pressure fluid for producing a biasing action, means for supplying said casing with fluid under pressure the force produced by such pressure in the casing being dependent upon said differential areas, whereby when said parts are rotated the fly ball members acted upon by centrifugal forces, move said cam surface member longitudinally until equilibrium between the action of the centrifugal forces and the resisting fluid pressure takes place, and wherein the stroke traveled by said fly balls on said curved surface is transmitted to said longitudinally moving member while the latter is subjected to a constant fluid pressure, the curvature of said cam surface being such that the ratio between the centrifugal force and the constant load on the longitudinal moving member always corresponds to the force normally exerted on the fly balls by the curved surface.

18. A speed governor for power and working machines allowing arbitrary speed adjustment at constant coefficient of speed variation, a rotatable casing, a support therein and rotatable therewith, flyball members on said support subjected by said support to a supporting force, a longitudinally moving member rotatable with said flyballs, having a curved cam surface acted upon by said flyballs, said member having pistons of different cross-sectional areas adapted to be acted upon by pressure fluid for producing a biasing action, means for supplying said casing with fluid under pressure, the force produced by such pressure in the casing being dependent upon said differential areas, whereby when said parts are rotated the flyball members being each acted upon by a centrifugal force, move said cam surface member longitudinally until equilibrium between the action of the centrifugal forces and the resulting fluid pressure takes place, and wherein the stroke traveled by said flyballs on said curved surface is transmitted to said longitudinally moving member while the latter is subjected to a constant fluid pressure, the curvature of said cam surface being such that for each position of the longitudinally moving member the force exerted by the flyball members normally to said curved surface forms with the respective supporting force, and the centrifugal force, a polygon of forces, the altitude of which is always equal to the load on the longitudinally moving member.

HUGO KIESER.